Inventor
Norman T. Paulsen

Patented June 1, 1954

2,679,762

UNITED STATES PATENT OFFICE 2,679,762

SPROCKET CHAIN

Norman T. Paulsen, Yorkville, Ill.

Application February 4, 1953, Serial No. 335,048

2 Claims. (Cl. 74—249)

The present invention relates to a new and improved sprocket chain. The present invention particularly relates to an improved sprocket chain with replaceable links which have hook ends that are so formed that when the chain is used in conjunction with a sprocket for movement therewith the forces exerted on the hook end of the links will tend to maintain the links in a properly assembled relation.

Prior to the present invention many types of replaceable link chains such as Ewart chains were available to those skilled in the art. However, such chains as those previously known almost invariably were subject to decoupling when the chain was rolled for storing, or packing or shipping and were also subject to decoupling by the forces exerted on the chain when the chain was employed for movement with a sprocket. Those chains heretofore known which were not subject to decoupling when rolled for storage or packing or shipping had hook ends of such a configuration that the space provided for removal of the next adjacent link was insufficient to to allow ready removal of that link and therefore required the use of excessive forces to spread the hook ends of the links to allow for ready decoupling.

Chains of this type, despite the difficulties encountered in their use, are very popular, particularly in farm equipment drive systems. In view of increasing popularity of these chains the aforementioned problems became increasingly acute and undesirable.

Additional problems also presented themselves and became particularly undesirable with the increased popularity of these chains. It became dangerous to approach a sprocket and chain combination when the chain was one such as those above described because the opening in the hook end of each link necessarily faced outwardly to prevent decoupling of the link. This was necessary because the opening in the hook was so positioned that if the closed side of the hook faced outwardly the opening would appear directly adjacent the pintle bar.

It is therefore an important object of the present invention to provide a sprocket chain with readily replaceable links which are secured in their position when assembled.

It is also an important object of this invention to provide a replaceable link chain which when employed in conjunction with a sprocket will present its closed side outwardly.

It is also an important object of this invention to provide a replaceable link for a sprocket chain, the link being formed of a single section of sheet material and which has an arcuate hook end with an opening therein sufficiently wide to permit ready coupling and decoupling with other links, the opening being substantially immediately adjacent to the side bars or arms of the link.

It is a still further object of the present invention to provide a sprocket chain with replaceable links in combination with a sprocket so arranged that the forces exerted on the hook ends of the link will tend to close the hook ends of the links and thereby prevent decoupling of the chain while in driving relation with the sprocket.

Still other and further objects and features of the present invention will be readily apparent from the further detailed description of the present invention and from the accompanying drawing with numerals of reference marked thereon, in which like numerals refer to like parts in the several figures, forming a part of this specification, and in which.

Figures 1, 2, 3:
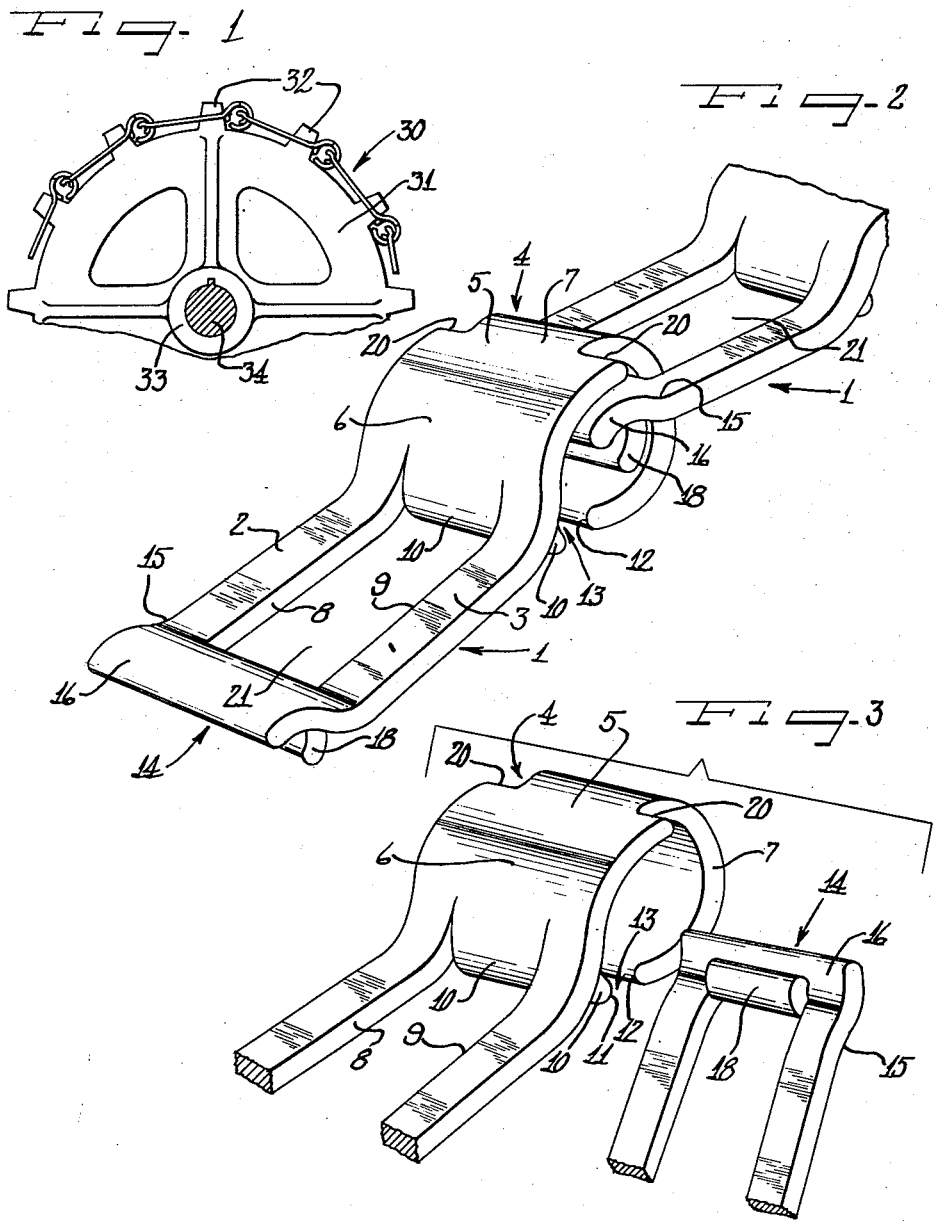
Figure 1 is a front elevational view of a sprocket and sprocket chain in driving relation, in accordance with the present invention.
Figure 2 is an isometric view of one link of the chain of Figure 1 and the pintle bar end of another link coupled thereto.
Figure 3 illustrates the two links of Figure 2 in position for coupling or immediately following decoupling.

Links for chains to be operatively and drivingly associated with sprockets in accordance with the present invention are generally rectangular in configuration and have arcuate sections at both ends thereof. These links also have a generally rectangular opening centrally positioned in the link for ready association with the teeth of a sprocket. Also, links in accordance with the present invention have a slot or opening extending laterally across the hook end of the link for ready coupling and decoupling with similar links whereby coupling of several links will form a chain of any desired length, endless or straight as desired.

A punching and shaping operation may be employed to form the links in accordance with the structural features hereinafter described and the links may be formed of any particular desired material such as malleable iron or sheet steel or the like. Preferably, however, the links are formed of sheet steel and may be hardened or case hardened as desired or necessity demands.

With reference to the drawings and particularly Figures 2 and 3 it will be observed that links forming a preferred embodiment of my invention are each of unitary construction, being made from a single piece of sheet material, either forged or stamped and shaped. These links indicated generally at 1 have a pair of side bars or arms 2, 3 which are substantially parallel and coextensive, that is, the arms 2 and 3 are of substantially the same length and parallel.

At one end of each of the links there is provided integrally with the arms or side bars 2, 3 an arcuate, substantially cylindrical hook end section 4, the axis of which preferably lies in the plane of the side bars or arms 2, 3 and is perpendicular to the side bars or arms 2, 3.

The main body portion or principal hook section 5 of the hook ends 4 is preferably a direct extension of the arms or bars 2, 3 and extends upwardly from one face of the link 1 thence forwardly and downwardly and then rearwardly and upwardly again to its termination 12 near the ends of the arms 2, 3 and forms a greater portion of the cylindrically shaped hook end 4. This body portion 5 of the hook ends 4 preferably has an area 6, where it is joined to the arms, which is as wide as the distance between the extreme lateral edges of the arms 2, 3 which width is maintained for preferably about 60 to 120° from the plane of the arm. The remaining area 7 of the body portion 5 of the hook end 4 has a width preferably substantially equal to or slightly less than the distance between the inwardly facing lateral edges 8, 9 of the arms 2, 3.

The small section 10 of the hook ends 4, formed preferably from part of the punched out section between the edges 8, 9 of the arms 2, 3 extends downwardly, or oppositely of the direction of the extension of the area 6 of the body portion 5 of the hook ends 4. This extension 10 is preferably quite short and terminates in an edge 11 which is spaced from the end 12 of the area 7. The spacing 13 between the two laterally extending edges 11 and 12 of the tongues 10, 5 respectively, is approximately equal to or slightly greater than the thickness of the sheet material from which the link 1 is formed.

At the other end of the link 1 there is provided a pintle bar or pin which is also integral with the arms 2, 3 of the link 1. This pintle pin 14, best viewed in Figures 2 and 3 is arcuate, preferably substantially semi-cylindrical in configuration, and has an outside diameter substantially equal to or smaller than the inside diameter of the hook section 4.

The pintle pin 14 is preferably constructed as an extension of the arms 2 and 3 and extends laterally thereacross at the end thereof and is initially bent slightly upwardly as at 15 and then extends rearwardly. The upper bar portion 16 of the pintle pin 14 may be slightly tapered or rounded or cut off square as desired. A lower bar 18 formed preferably from part of the punched out section between the inwardly facing edges 8, 9 of the arm 2, 3 is bent downwardly and extends forwardly for a short distance and thus provides an increased surface area for the pintle pin 14.

Thus, it will be observed that the link in accordance with the present invention extends in a longitudinal direction and has a relatively large cylindrical portion at one end, preferably the forward end, with a lateral slot therein of about the same width as the thickness of the material from which the link is formed and at the other end of the link, preferably the rearward end, there is a smaller, preferably semi-cylindrically shaped portion which serves as a pintle pin. When several links of this character are coupled together with the pintle pin of one link resting within the hook portion of the next immediately rearwardly adjacent link, a chain is formed which chain has replaceable links enabling shortening or lengthening of the chain or replacing broken or deformed links.

Coupling of links made in accordance with my invention to form chains is a relatively simple matter and may be best understood by reference to Figure 3. To couple two links together they are positioned at a substantially acute angle to each other with the pintle pin of one immediately adjacent and laterally disposed from the hook or hook shaped tongue of another with the under side of one link facing the under side of the other. The links are preferably disposed so that the axis of the cylindrically shaped hook end of the said other link is in line with the axis of the semi-cylindrically shaped pintle pin of the said one link. Relative lateral movement of the two links to superimpose one upon the other couples the two links since the slot 13 between the edge 12 of the tongue 5 and the edge 11 of the extension 10 is slightly greater in width than the thickness of the arms 2, 3 and the arms slip through the slot. Thereafter increasing the angle between the two links securely couples the links. The tongue or extension 5 forming the greater portion of the hook 4 of one link readily fits between the inwardly facing edges 8, 9 of the arms 2, 3 of the next link. As above described it is preferable to have the axis of the hook and the axis of the pintle pin in the same plane as the plane of the arms 2 and 3. This construction is preferred so that when several links are coupled together to form a chain in accordance with the above described method of coupling, the arms 2 and 3 of all of the links 1 may lie in a common plane if the chain is extended in a straight line or substantially straight line.

Decoupling of any two immediately adjacent links is equally as readily accomplished as coupling. To decouple two immediately adjacent coupled links, the two links are disposed at an acute angle to each other whereby the pintle pin and the arms 2, 3 of one link lie immediately adjacent the slot 13 between the edges 11, 12 in the hook 4 of the next link. Relative lateral movement between the two links readily separate the same since the slot 13 has a width equal to or slightly greater than the thickness of the material of the arms 2 and 3.

It is an important feature of my invention that when a chain is constructed with links as those above described, whether the slot 13 in the links is faced upwardly or downwardly and whether the hook ends 4 of the links is disposed forwardly or rearwardly, there is provided nevertheless a securely attached chain; the links will not tend to detach themselves and tensioning the chain will not tend to pull the links apart inasmuch as the slot 13 is disposed sufficiently close to the ends of the arms 2, 3 to require the pintle pin to engage the inner face of the hook at a considerable distance from the slot 13.

Disengagement of heretofore known replaceable link chains was particularly acute when the chains were employed with sprockets rather than in straight tension. A chain in accordance with my invention, however, will not tend to decouple when employed with a sprocket since several unique advantages obtain from the association of my chain and a sprocket.

With reference to Figure 1 it may be observed that whereas prior chains required that the slots in the hook end of the chain face upwardly or radially outwardly so as to reduce the tendency of the links therein to decouple, when my chain is associated with a sprocket a preferable mode of association is with the slots 13 in the links facing downwardly and into the sprocket.

With the slot 13 facing downwardly toward the axis of the sprocket there is provided a sprocket and chain arrangement which is considerably safer than heretofore known arrangements inasmuch as no sharp edges are exposed to injure anyone accidentally or intentionally touching or otherwise contacting the peripheral surface of the chain and sprocket arrangement. Although the edges 20 forming the steps in the tongue 5 are exposed in such an arrangement these may be rounded or tapered and thus not serve to substantially reduce the increase in safety of arrangement.

An even more important feature of the arrangement of my chain and a sprocket resides in the unique characteristic of the arrangement shown in Figure 1 which characteristic is one that tends to close the slot 13 rather than to open the same when the chain and sprocket are in driving relation.

With the links 1 forming a chain 30 operably associated with a sprocket 31 having a hub 33 carrying a shaft 34, teeth 32 extending through the slots 21 in the links 1, the chain 30 is drivingly associated with the sprocket 31 for rotational movement, preferably in a clockwise direction. Although the illustration of Figure 1 is such that the driving force would be exerted by the sprocket 31 for convenience purposes, it is relatively immaterial to the characteristic immediately above mentioned whether the chain 30 drives the sprocket 31 or the sprocket 31 drives the chain 30. The forces exerted on the hook ends 4 of the links 1, when the chain 30 is operatively associated with a sprocket 31, are such that they tend to close rather than to open the slot 13 and thus increase prevention of decoupling the chain since the radial forces on the links are directed inwardly and tend to squeeze the slots 13 closed.

Although I have described a preferable association of my chain and a sprocket with the slot 13 in the hook ends of the links facing inwardly it should of course be understood that the material from which my chain is made (preferably sheet steel) is of sufficient strength that no ordinary forces exerted on the chain will unduly open the slot 13 and that therefore my chain may also be associated with a sprocket with the slot 13 facing outwardly if that is preferred for any reason.

While I have shown and described certain particular embodiments of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. A one piece sprocket chain link of sheet metal comprising a pair of substantially parallel, spaced, coextensive side bars, a pintle bar extending across said side bars at one end thereof and integral therewith, and a hook section at the other end of said side bars formed as an integral, smoothly continuous, arcuate, direct extension of the side bars, said hook section constituted by a direct extension of said side bars extending upwardly from one face of the link, thence forwardly and downwardly and then rearwardly and upwardly again, terminating near the proximate ends of the side bars, the first upwardly extending portion being as wide as the distance between the lateral edges of the side bars and integral therewith and being of substantial extent, said forwardly, downwardly, rearwardly and second upwardly extending portions being of a width less than the distance between the side bars but spaced therefrom to provide a slot wider than the pintle bar to permit coupling and pivoting with the pintle bar of a similar sprocket chain link without binding.

2. In a one piece sprocket chain link as described in claim 1, the pintle bar being arcuate complementary to the interior of the arcuate hook section.

References Cited in the file of this patent

UNITED STATES PATENTS

| Number | Name | Date |
|---|---|---|
| 286,338 | Shields | Oct. 9, 1883 |
| 297,793 | Hall | Apr. 29, 1884 |
| 635,790 | Macphail | Oct. 31, 1899 |
| 791,337 | Fritsche | May 30, 1905 |
| 2,530,014 | Holmes | Nov. 14, 1950 |